(12) United States Patent
Kawasaki et al.

(10) Patent No.: US 6,608,995 B1
(45) Date of Patent: Aug. 19, 2003

(54) DETECTION CIRCUIT FOR PROXIMITY IC CARD DEVICE

(75) Inventors: Yusuke Kawasaki, Kawasaki (JP); Yoshiyasu Sugimura, Kawasaki (JP); Shigeru Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/503,356

(22) Filed: Feb. 14, 2000

(30) Foreign Application Priority Data

Jul. 29, 1999 (JP) ............................... 11-215465

(51) Int. Cl.[7] ............................................... H04B 5/00
(52) U.S. Cl. ........................ 455/41; 327/58; 327/62; 327/77; 455/106; 340/10.1; 340/10.3; 340/10.42
(58) Field of Search ................... 455/41, 106; 342/42, 342/43, 44, 51; 235/380, 382; 327/78, 80, 77, 81, 58, 62; 340/10.1, 10.2, 10.3, 10.4, 10.5, 10.6, 10.33, 10.34, 10.41, 10.42

(56) References Cited

U.S. PATENT DOCUMENTS

| 3,031,624 A | | 4/1962 | Moore et al. |
|---|---|---|---|
| 4,063,184 A | * | 12/1977 | Ohsawa |
| 5,541,907 A | | 7/1996 | Kurihara et al. |
| 5,594,384 A | * | 1/1997 | Carroll et al. |
| 6,223,990 B1 | * | 5/2001 | Kamei |
| 6,239,625 B1 | * | 5/2001 | Abe |

FOREIGN PATENT DOCUMENTS

| EP | 0 843 407 A | 5/1998 |
|---|---|---|
| FR | 2 660 780 A | 10/1991 |
| GB | 2 243 964 A | 11/1991 |
| JP | 7-262561 | 10/1995 |

* cited by examiner

Primary Examiner—Dwayne Bost
Assistant Examiner—Huy Nguyen
(74) Attorney, Agent, or Firm—Armstrong, Westerman & Hattori, LLP

(57) ABSTRACT

The present invention relates to a proximity IC card (PICC). More particularly, the present invention relates to and provides a detection circuit of a simple structure, which is easy to set up in a PICC and a proximity coupling device (PCD) for transmitting data to and receiving data from the PICC. This detection circuit is operative to detect a subcarrier signal sent from a PICC and superposed onto a carrier signal received through an antenna. Further, this detection circuit comprises a bias circuit for applying predetermined DC potential to a signal received from the antenna, a rectifier circuit for extracting a subcarrier signal superposed onto the carrier signal by rectifying a signal received from the antenna at a bias point, and an amplifier circuit for amplifying the subcarrier signal extracted at the bias point.

7 Claims, 4 Drawing Sheets

DETECTION CIRCUIT FOR PROXIMITY IC CARD DEVICE

BACKGROUND OF THE INVENTION

1. Field of the Invention

The present invention generally relates to a proximity IC card (hereunder abbreviated to "PICC") and, more particularly, to a detection circuit for use in a PICC reader/writer (hereunder abbreviated as PICC-R/W) for writing data to and reading data from a PICC.

2. Description of the Related Art

PICC standards are described in ISO/IEC (International Organization for Standardization/International Electrotechnical Commission) 14443. Hereinafter, in relation to the present invention, a brief description is given about a part of ISO/IEC 14443 which relates to a type-B communication interface for a PICC and which describes the properties and characteristics of a field that provides power transmission and two-way or bidirectional communication between a PICC and a proximity coupling device (hereunder abbreviated to PCD), such as the PICC-R/W.

(1) Power Transmission from PCD to PICC

To supply effective power to the PICC in a radio frequency (RF) operating field, a carrier (having a carrier frequency of $f_c$=13.56 MHz) is transmitted from the PCD to the PICC, whereupon the received carrier is rectified to thereby generate electric power needed for an operation of an internal circuit.

(2) Communication from PCD to PICC

The PCD transmits data to the PICC by amplitude-shift-keying (ASK) modulating the amplitude of the carrier with a modulation index or factor of 10% at a data bit rate of 106 Kbps (=$f_c$/128).

(3) Communication from PICC to PCD

The PICC transmits data to the PCD by performing load modulation of a load for reception of the carrier at a frequency $f_s$(=$f_c$/16), which is (1/16)the carrier frequency, to thereby generate a subcarrier (whose frequency $f_s$=847 kHz), and by then binary-phase-shift-keying (BPSK) modulating the phase of the subcarrier at a data bit rate of 106 Kbps (=$f_c$/128).

FIG. 1 schematically shows the constitution of an example of a PICC.

In the case 6f the example of FIG. 1, two chips respectively constituting a central processing unit (CPU) portion 11 and an RF portion 12 are incorporated into a card body 10. Further, an antenna (AT) 13, wound like a coil, is disposed along the periphery of the card body 10. The CPU portion 11 is constituted by what is called a one-chip computer and includes a CPU, memories such as a ROM, a RAM, and an EEPROM, and an input/output (I/O) interface.

FIG. 2 shows the constitution of an example of the communication interface between a PCD and a PICC.

In the case of the communication from the PCD to the PICC, which has been described in the foregoing section (2), a modulation portion (MOD) 20 of the PCD performs ASK modulation of the amplitude of a carrier (having a carrier frequency of $f_c$=13.56 MHz) with a modulation index of 10%. Then, a resultant signal is transmitted from the PCD to the PICC through output amplifiers 22 and 23 and an antenna 24.

In contrast, in the case of the communication from the PICC to the PCD, which has been described in the foregoing section (3), a load 26 for reception of an RF signal is varied under the control of a modulation portion (MOD), 28 of the RF portion 12 of the PICC shown in FIG. 1. Then, a BPSK modulation for providing binary phase information (representing 0 or 180 degrees) is performed on a subcarrier (whose frequency $f_s$=847 kHz) generated by a load modulation (resulting in an amplitude modulation (hereunder referred to as an AM modulation)).

The modulated signal is transmitted to the PCD through an antenna 25 (corresponding to the antenna 13). Actually, a detection portion (DET) 21 of the PCD detects the carrier that is outputted by the PCD itself and that undergoes the load modulation (including the BPSK modulation) performed by the PICC.

FIG. 3 shows the constitution of an example of the conventional detection portion 21.

In the communication interface of FIG. 2, a signal received by the antenna 24 is amplified by an amplifier circuit 1 comprising a transistor (Tr1) 32. Subsequently, the amplified signal undergoes a half-wave rectification performed by a diode (D1) 34 and a capacitor 35 of the next stage that is a detection circuit. In the case of such a half-wave rectified signal, the subcarrier signal having undergone the AM modulation (including the BPSK modulation) performed by the PICC is superposed onto a direct current (DC) component thereof. Then, such a half-wave rectified signal is amplified to a predetermined level in the next stage that is an amplifier circuit 2 comprising a transistor (TR2) 37.

As described above, in the circuit of the conventional detection portion, usually, the subcarrier undergoing the AM modulation(including the BPSK modulation) is detected by the diode 34. Moreover, the level of the received signal largely varies with the distance between the PCD and the PICC. It is, therefore, necessary, for receiving and detecting a micropower subcarrier, to amplify a carrier itself including a subcarrier in the amplifier circuit 1 of the first stage so that the amplified voltage level is not less than the forward voltage ($V_f$) of the diode 34.

Furthermore, in addition to the aforementioned amplification of the carrier by the amplifier circuit 1, it is necessary, for limiting the level of a detected signal to within a receivable signal level range by simultaneously avoiding signal saturation, to amplify the carrier and the detected signal, whose level has dropped by the forward voltage of the diode 34 after the detection thereof, in the amplifier circuit 2 of the next stage. As a result, the conventional detection portion has complex constitution and a large number of components.

Additionally, the conventional detection portion has a drawback in that waveform distortion occurs in the amplified signal because the amplifier circuit 1 of the first stage amplifies the micropower signal by using a non-linear region thereof. Further, in the conventional detection portion of the circuit constitution of FIG. 3, bias points of the amplifier circuits 1 and 2 are determined according to the level of the received signal and vary with the distance between the PCD and the PICC. Thus, the conventional detection portion has another drawback in that it is difficult to determine the amplification factors of the amplifier circuits 1 and 2 in the case of comprehensively judging the aforementioned conditions such as the forward voltage drop across the diode 34, the saturation level of the amplified signal, and the range of the receivable signal level.

SUMMARY OF THE INVENTION

Accordingly, in view of the aforementioned drawbacks of the conventional detection circuit, an object of the present invention is to provide a detection circuit which can easily determine the amplification factors of the amplifiers, and which can reduce the waveform distortion of an amplified signal, and which has a simple structure comprising a smaller number of components.

To achieve the foregoing object, according to an aspect of the present invention, there is provided a detection circuit for detecting a subcarrier signal sent from a PICC and superposed onto a carrier signal received through an antenna. This detection circuit comprises a bias circuit for applying a predetermined DC potential to a signal received from the antenna, a rectifier circuit for extracting a subcarrier signal superposed onto the carrier signal by rectifying a signal received from the antenna at the DC bias point, and an amplifier circuit for amplifying the subcarrier signal extracted at the bias point.

This rectifier circuit comprises a transistor circuit having a base terminal to which a bleeder voltage is supplied, from a power supply bleeder circuit as a DC bias, together with the signal received from the antenna. The transistor circuit further has a collector terminal connected to a power supply, and has an emitter terminal to which a resistor and a capacitor are connected. A rectified subcarrier signal is outputted from the emitter terminal.

Further, according to another aspect of the present invention, there is provided a detection circuit for detecting a data signal sent from a PICC and superposed onto a carrier signal received through an antenna. This detection circuit comprises a bias circuit for applying a predetermined DC potential to a signal received from the antenna, a rectifier circuit for extracting a data signal superposed onto the carrier signal by rectifying a signal received from the antenna at the DC bias point, and an amplifier circuit for amplifying the data signal extracted at the bias point.

The bias circuit is a power supply bleeder circuit for dividing a power supply voltage. Further, the rectifier comprises a transistor circuit having a base terminal to which a bleeder voltage is supplied, from the power supply bleeder circuit as a DC bias, together with the signal received from the antenna. The transistor circuit further has a collector terminal connected to a power supply and has an emitter terminal to which a resistor and a capacitor are connected. A rectified data signal is outputted from the emitter terminal.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Figure 1:
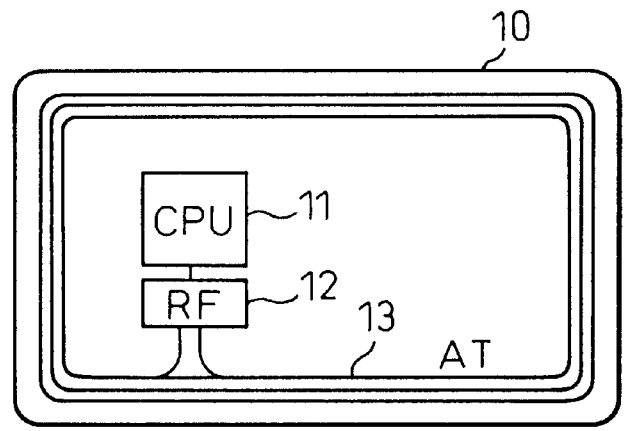
FIG. 1 is a diagram showing the constitution of an example of a PICC.
Figure 2:
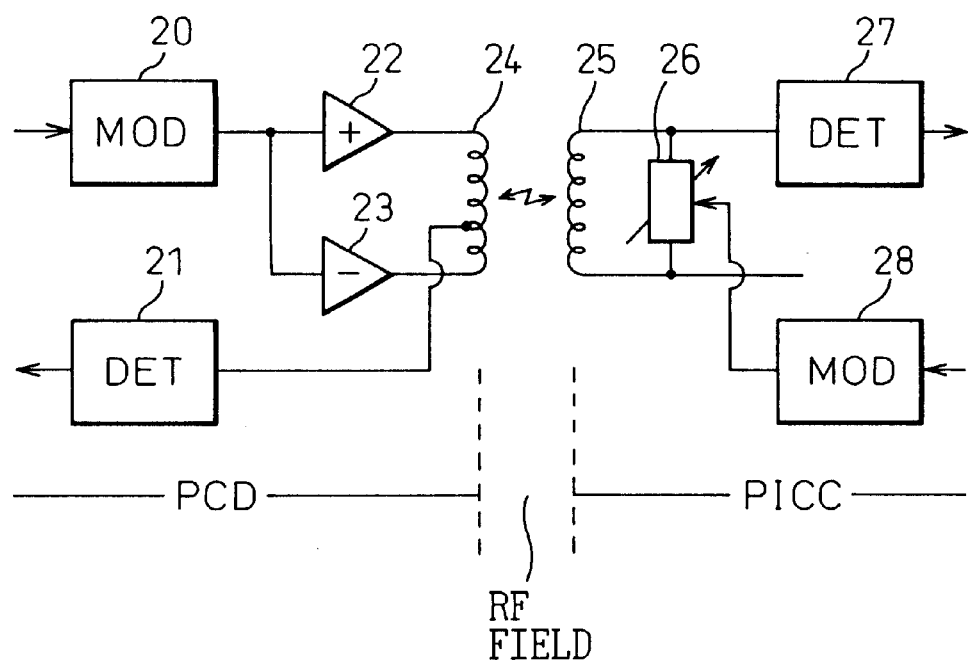
FIG. 2 is a diagram showing an example of the communication interface between a PCD and a PICC.
Figure 3:
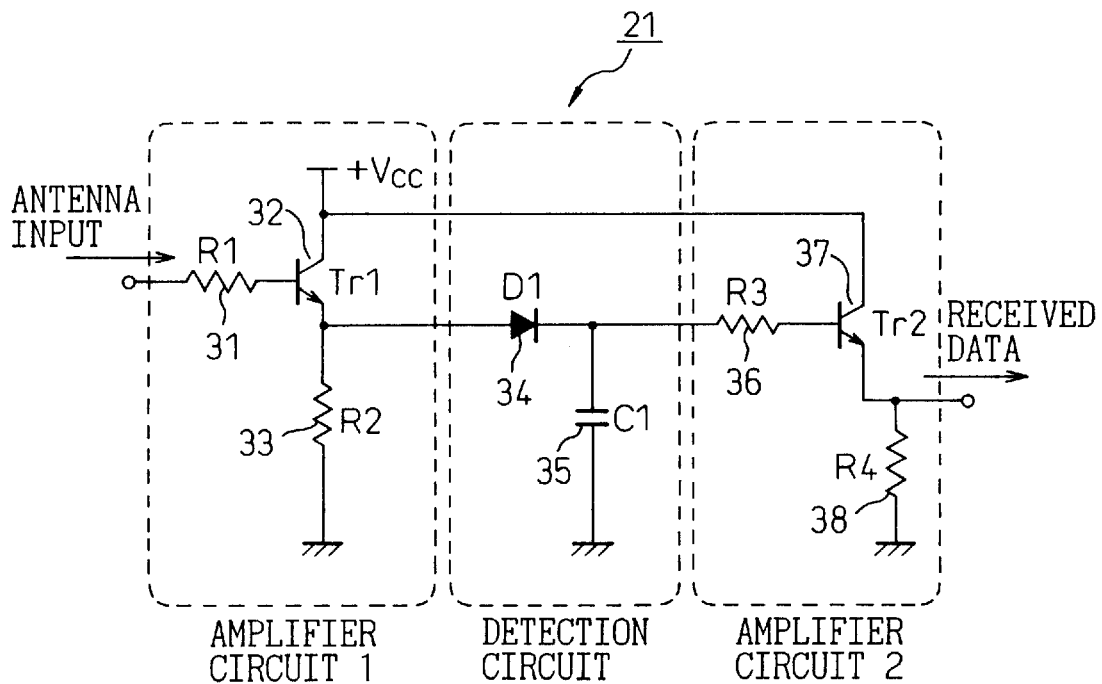
FIG. 3 is a diagram showing the circuit constitution of an example of a conventional detection portion.
Figure 4:
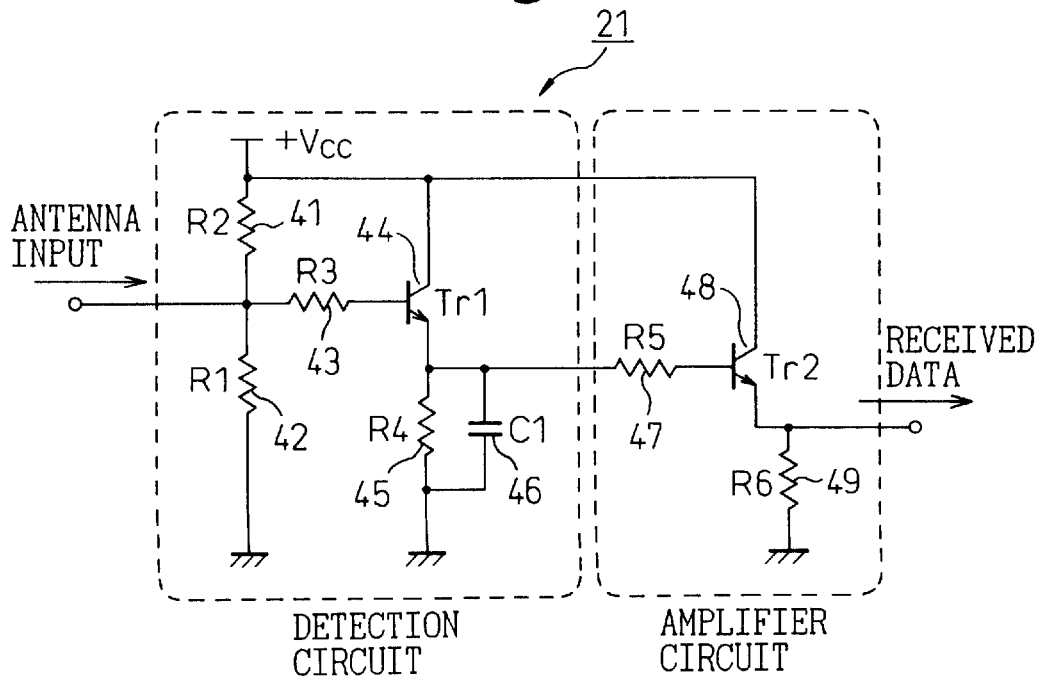
FIG. 4 is a diagram showing the circuit constitution of an embodiment of a detection portion of the present invention.

FIG. 4 shows an embodiment of the detection portion of the present invention.

Figure 5:
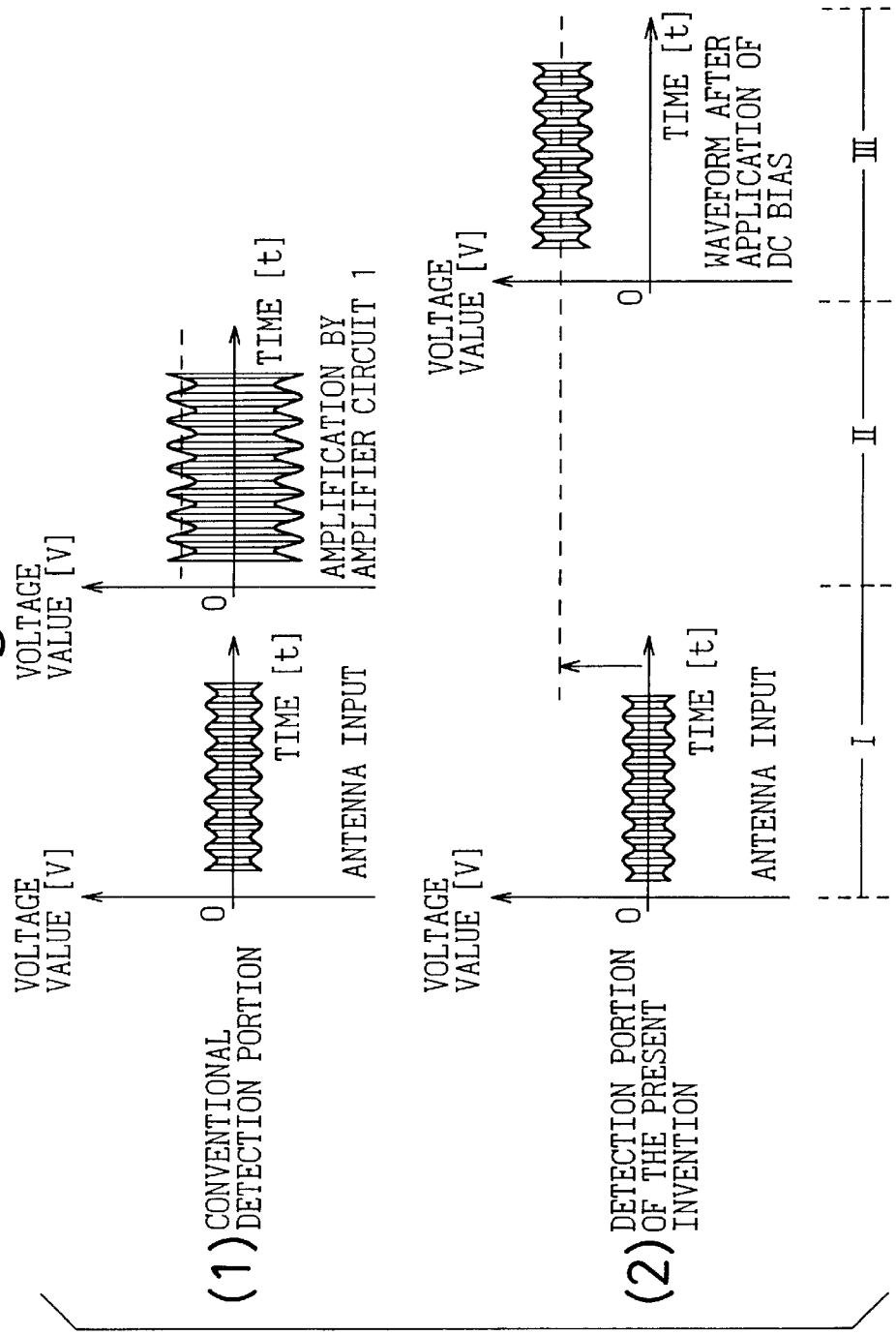
FIG. 5 is a diagram showing an operation (1) of the detection portion.
Figure 6:
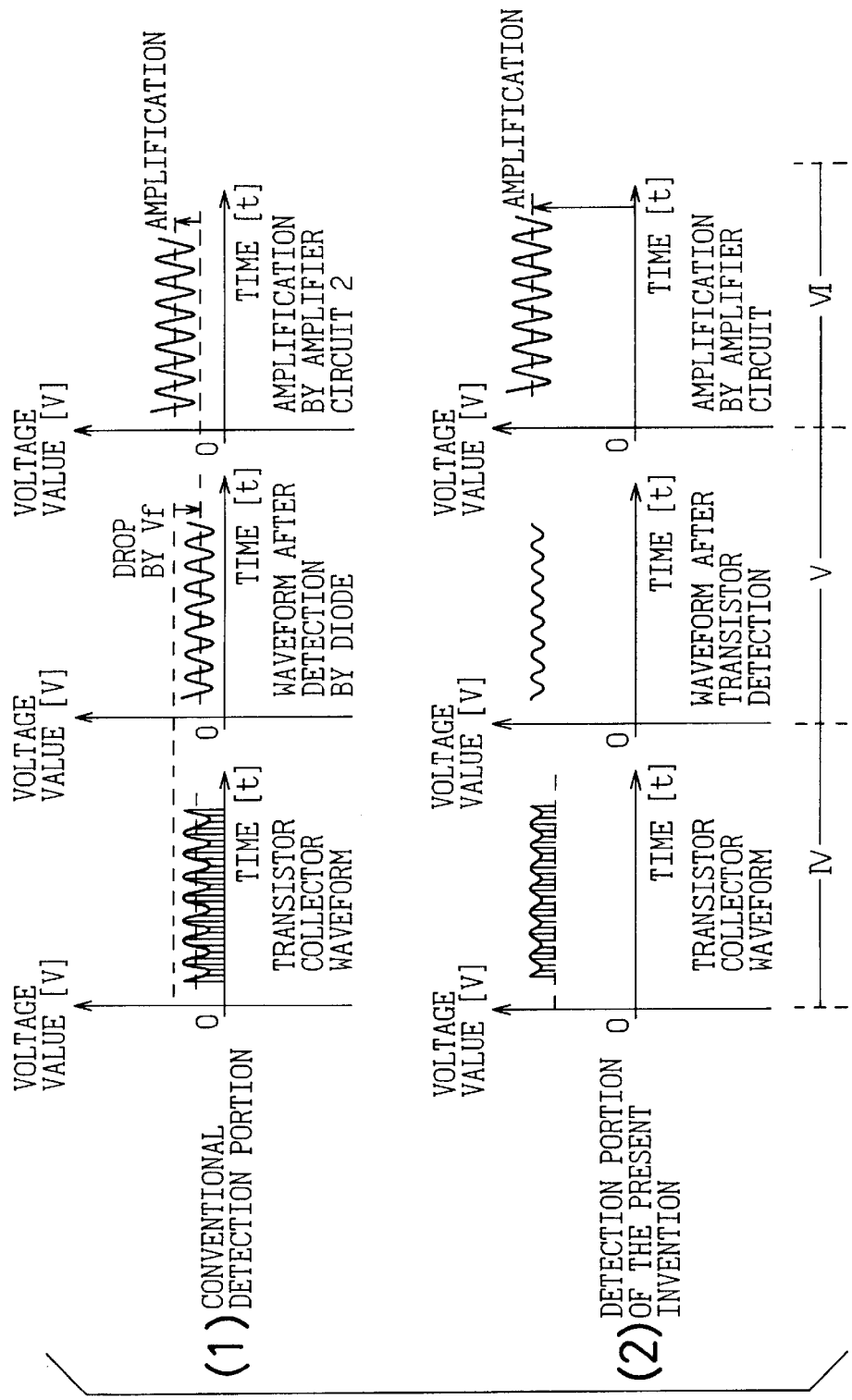
FIG. 6 is a diagram showing an operation (2) of the detection portion.

FIGS. 5 and 6 illustrate an operation (2) of the detection portion of the present invention of FIG. 4, in comparison with an operation (1) of the conventional detection portion.

First, a carrier signal, on which a subcarrier is superposed, is inputted to an antenna 24 (see "I" in FIG. 5). The signal received by the antenna 24 is then inputted to the detection portion 21. In the case of the operation (1) of the conventional detection portion, the input signal is amplified by employing ground potential as reference potential in order to obtain a subcarrier potential that is not less than the forward voltage of the diode 34 (see "II" in FIG. 5). In this case, and especially in the case of a micropower input signal, waveform distortion occurs in the amplified signal owing to a non-linear region of the base-emitter characteristic of a transistor 32 (see "IV" in FIG. 5).

On the other hand, in the case of the operation (2) of the detection portion of the present invention, a fixed bias potential is applied to the signal, which is received by the antenna 24, by a bias circuit that is a resistor bleeder circuit comprising a resistor (R1) 41 and a resistor (R2) 42 (see "III" in FIG. 5). This eliminates the necessity for an amplifier circuit similar to the amplifier circuit 1, which is provided in the conventional detection portion by taking the forward voltage of the diode into consideration, even in the case of the micropower input signal. Thus, an occurrence of waveform distortion due to the amplification operation of such an amplifier circuit is avoided (see "IV" in FIG. 5). That is, in the case of the detection portion of the present invention, an extremely weak current is fed to the base of a transistor (Tr1) 44 at all times, so that an operation of the transistor in a linear region is ensured regardless of the level of the input signal.

The aforementioned transistor 44 operates as both of an input buffer and a rectifier diode (see "V" of FIG. 5). An output bias potential of a rectifier circuit consisting of the transistor 44, a resistor (R4) 45, and a capacitor (C1) 46 is fixed by the charging potential (namely, (the fixed bias potential—$V_{BE}$ voltage of the transistor 44)) of the capacitor 46. Therefore, in the case of the detection portion of the present invention, a fixed margin for amplifying the subcarrier is ensured regardless of the level of the input signal. This eliminates the difficulty in setting the amplification factors of the amplifier circuits 1 and 2 by using a level diagram, as described in the foregoing description of the conventional detection portion.

As a result, the amplification factor of the amplifier circuit of the next stage is easily determined (see "VI" in FIG. 5) by considering only the output bias potential of the rectifier circuit as the low level, and the saturation level of the amplified signal due to the power supply voltage ($V_{cc}$) as the high level, and the range of receivable signal levels of a subcarrier detection circuit of a subsequent stage (not shown).

In contrast, in the case of the operation (1) of the conventional detection portion, variation in bias potential due to the input signal level occurs in the amplifier circuit 1 of the front stage, and further, such variation in bias potential occurs even in the amplifier circuit 2 of the rear stage (see "V" and "VI" in FIG. 5), as described above. Consequently, it is difficult to set the level diagram corresponding to each of the amplifier circuits. Hence, the subcarrier detection circuit of the rear stage should be constituted in such a manner as to be able to deal with the variation in the bias level. Moreover, in the case of the micropower input signal, it is necessary to compensate for the waveform distortion, which is caused by the amplification of such an input signal, by using a circuit of some kind.

As is apparent from the foregoing description of the detection portion of the present invention, all the drawbacks of the conventional circuit are eliminated by the present invention. Incidentally, in the foregoing description, the detection portion at the side of the PCD according to the present invention has been described. However, needless to say, a detection portion of similar circuit constitution may be preferably used at the side of the PICC, because such a detection portion similarly operates by replacing a subcarrier signal obtained by AM-modulating the carrier, which is generated by the PICC, with a data signal obtained by AM-modulating the carrier, which is generated by the PCD.

As described above, according to the present invention, all the drawbacks of the conventional detection portion are eliminated by a detection portion of simple circuit constitution having a small number of components. That is, according to the present invention, there is provided a detection portion of a simple constitution having a small number of components, which easily determines the amplification factors of the amplifier circuits without considering the forward voltage drop across the diode, different from the conventional detection portion, and which reduces waveform distortion occurring after the amplification of the signal.

The device of the present invention is of great value as a detection circuit for use in devices, such as a PICC and a PCD, which require a reduction in the number of components and must perform normal operations in an RF field.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A detection circuit for detecting a subcarrier signal sent from a proximity IC card and superposed onto a carrier signal received through an antenna, said detection circuit comprising:

a bias circuit for applying predetermined DC potential to a signal received from said antenna;

a rectifier circuit for extracting a subcarrier signal superposed onto the carrier signal by rectifying a signal received from said antenna at the DC bias point; and an amplifier circuit for amplifying the subcarrier signal extracted at the DC bias point.

2. The detection circuit according to claim 1, wherein said bias circuit is a power supply bleeder circuit for dividing a power supply voltage, wherein said rectifier circuit comprises a transistor circuit having:

a base terminal, to which a bleeder voltage is supplied from said power supply bleeder circuit as the DC bias, together with the signal received from said antenna;

a collector terminal connected to a power supply, and an emitter terminal to which a resistor and a capacitor are connected, and wherein a rectified subcarrier signal is outputted from said emitter terminal.

3. The detection circuit according to claim 2, wherein said power supply bleeder circuit is a resistive voltage divider.

4. The detection circuit according to claim 2, wherein said amplifier circuit comprises a transistor circuit having:

a base terminal to which the rectified subcarrier signal is supplied;

a collector terminal connected to said power supply; and an emitter terminal from which a signal obtained by amplifying the rectified subcarrier signal is outputted.

5. A detection circuit comprising:

a first resistor having two terminals, one of which is connected to a power supply voltage;

a second resistor having a terminal connected to the other terminal of said first register, and having the other terminal connected to ground potential;

a third resistor having two terminals, one of which is connected to a connection point between said first and second resistors, said connection point being connected to a signal input terminal;

a first transistor having a base terminal connected to the other terminal of said third resistor, a collector terminal connected to said power supply, and an emitter terminal;

a fourth resistor having a terminal connected to said emitter terminal of said first transistor, and having the other terminal connected to the ground potential;

a capacitor having a terminal connected to said emitter terminal of said first transistor, and having the other terminal connected to the ground potential;

a fifth resistor having two terminals, one of which is connected to said emitter terminal of said first transistor;

a second resistor having a base terminal connected to the other terminal of said fifth resistor, and having a collector terminal connected to said power supply, and an emitter terminal connected to a signal output terminal; and a sixth resistor having a terminal connected to said emitter terminal of said second transistor, and having the other terminal connected to the ground potential.

6. A detection circuit for detecting a data signal sent from a proximity IC card and superposed onto a carrier signal received through an antenna, said detection circuit comprising:

a bias circuit for applying predetermined DC potential to a signal received from said antenna;

a rectifier circuit for extracting a data signal superposed onto the carrier signal by rectifying a signal received from said antenna at the DC bias point; and an amplifier circuit for amplifying the data signal extracted at the DC bias point.

7. The detection circuit according to claim 6, wherein said bias circuit is a power supply bleeder circuit for dividing a power supply voltage, wherein said rectifier comprises a transistor circuit having:

a base terminal, to which a bleeder voltage is supplied from said power supply bleeder circuit as the DC bias, together with the signal received from said antenna;

a collector terminal connected to a power supply; and an emitter terminal, to which a resistor and a capacitor are connected, and from which a rectified data signal is outputted.

* * * * *